June 8, 1965  B. TALBUTT  3,187,638
PORTABLE AIR SAW
Filed July 2, 1963  3 Sheets-Sheet 1
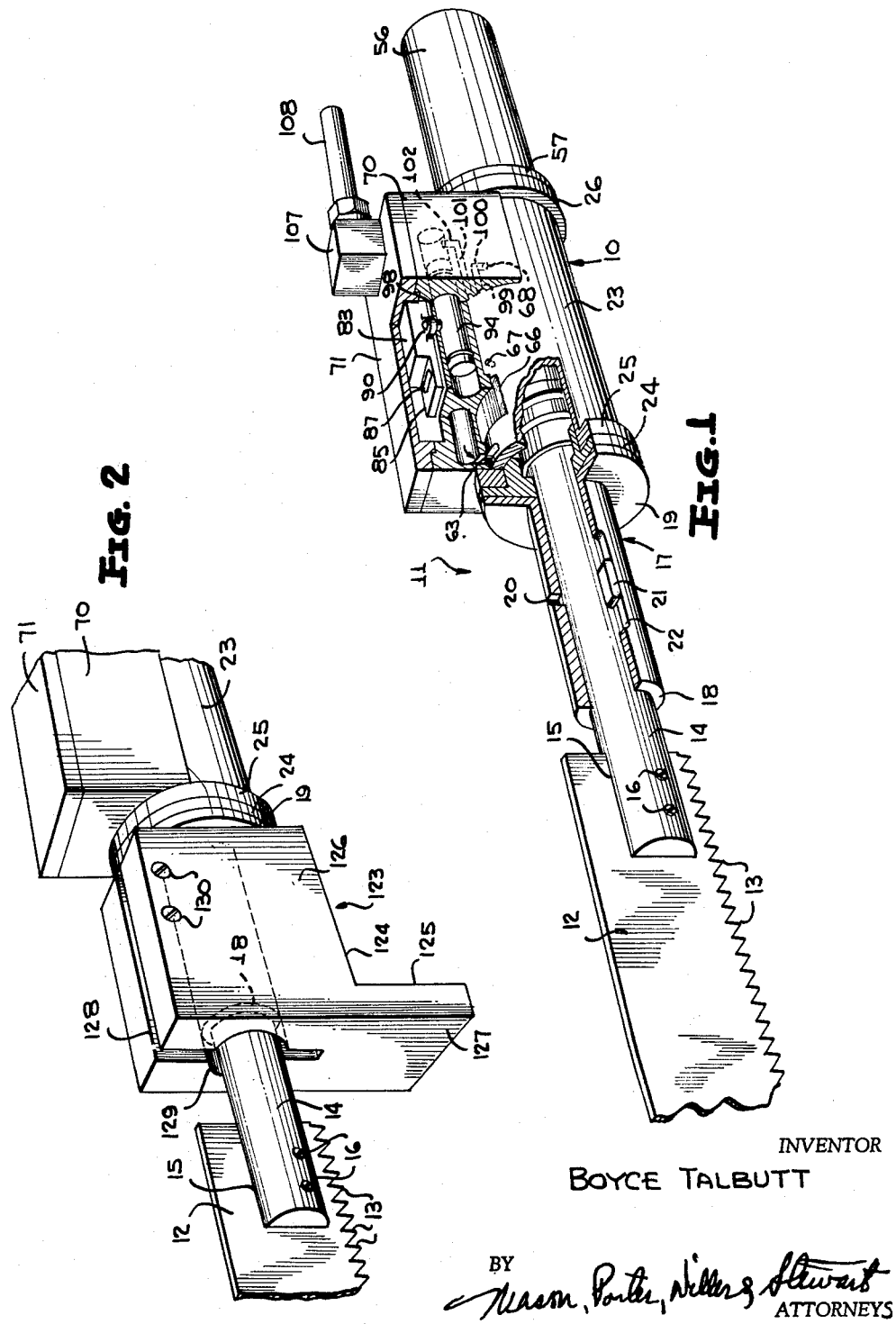
INVENTOR
BOYCE TALBUTT
BY
ATTORNEYS June 8, 1965  B. TALBUTT  3,187,638
PORTABLE AIR SAW
Filed July 2, 1963  3 Sheets-Sheet 2
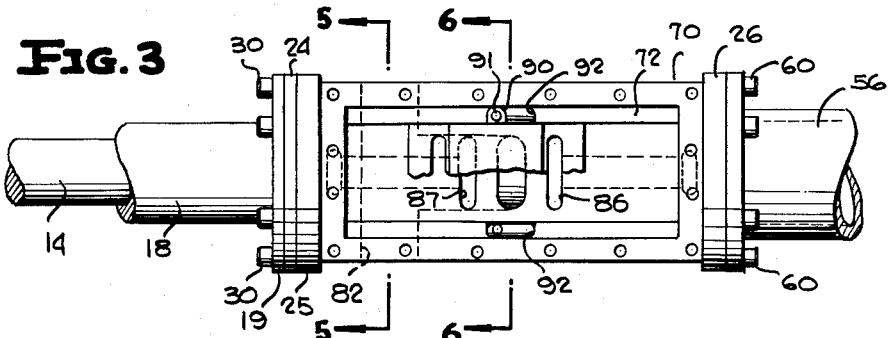
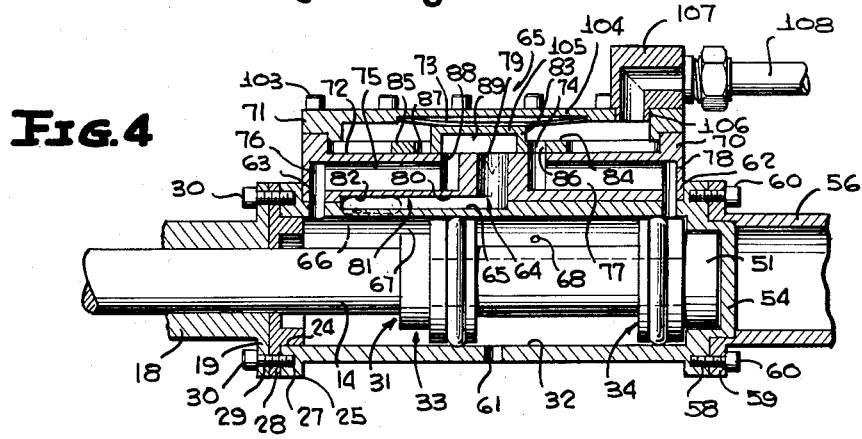
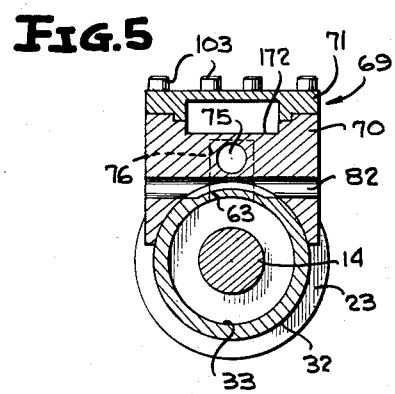 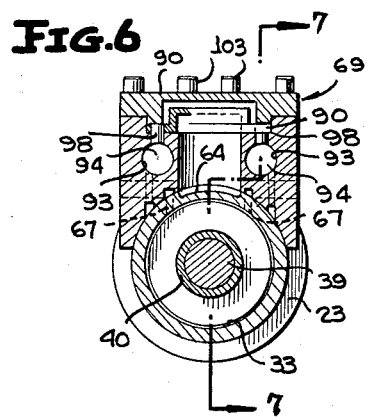
INVENTOR
BOYCE TALBUTT June 8, 1965  B. TALBUTT  3,187,638
PORTABLE AIR SAW
Filed July 2, 1963  3 Sheets-Sheet 3
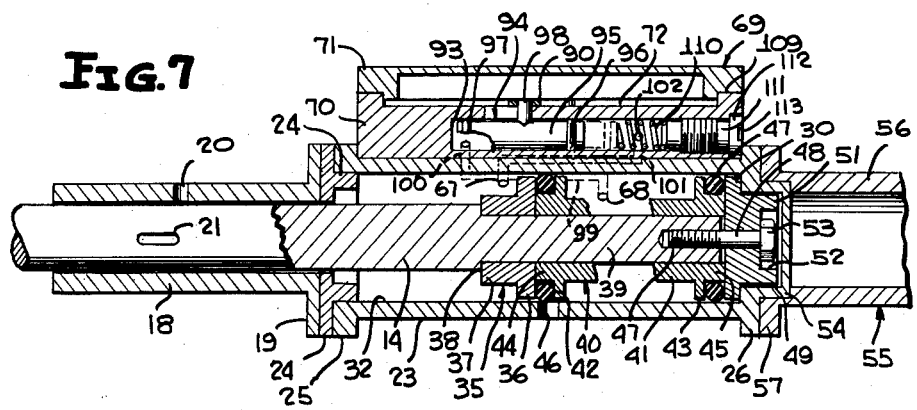
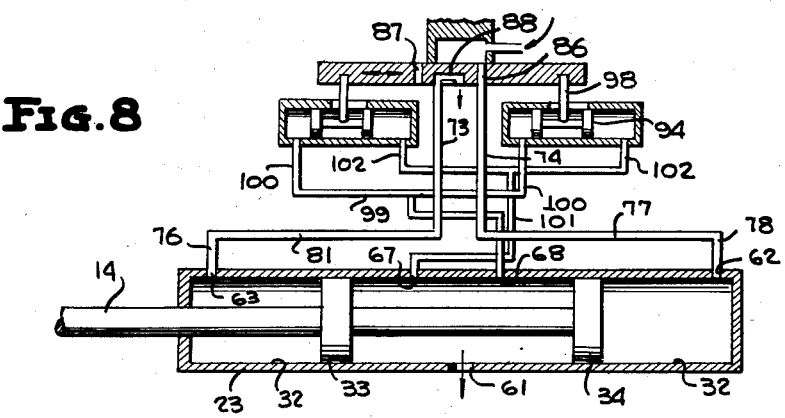
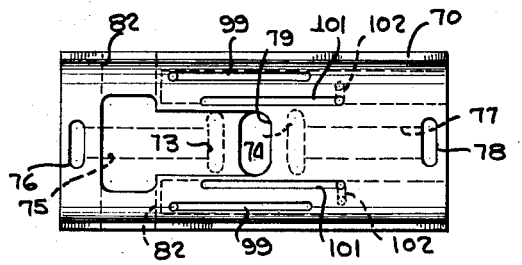
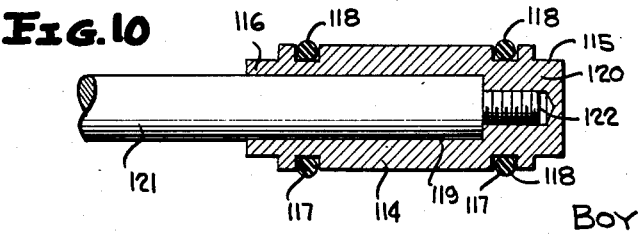
INVENTOR
BOYCE TALBUTT
BY
ATTORNEYS United States Patent Office 3,187,638
Patented June 8, 1965

3,187,638
PORTABLE AIR SAW
Boyce Talbutt, 805 16th St., Boulder, Colo.
Filed July 2, 1963, Ser. No. 292,311
4 Claims. (Cl. 91—290)

This invention relates in general to an air driven saw for use in pruning branches of fruit trees and the like.

Structures of this general type are known and are normally comprised of a main piston mounted for reciprocation within a cylinder. A driving fluid, such as steam, is normally supplied under pressure to a valve arrangement which alternately directs the driving fluid first to one side of the piston and then to the other. This alternative directing of the driving fluid by the valve arrangement causes the piston to reciprocate and thus produces the desired reciprocation of a saw blade which is attached to a piston rod which is fixed to the piston.

It is an object of this invention to provide a fluid driven saw which is light in weight and readily portable for convenient handling by a workman.

A further object of this invention is to provide a fluid driven saw which includes a reciprocable piston which is effectively cushioned at each end of a stroke to decrease vibration and shock to the workman.

Another object of this invention is to provide a fluid operated saw which, upon stopping, will always be in position for immediate start-up.

A further object of this invention is to provide a block member attachment for a housing of the portable saw which can be held against the material to be sawed so that the saw provides a draw-cut action.

Another object of this invention is to provide a barrel member for slidably receiving a reciprocable piston rod and to attach a saw blade to one end of the piston rod.

A further object of this invention is to provide a keyway in the barrel member and a key on the reciprocable piston rod to prevent rotation of the piston rod and saw blade relative to the housing of the saw.

Another object of this invention is to provide means for connecting the block member attachment to the barrel member.

Another object of this invention is to provide a valve assembly for a fluid driven saw which valve assembly includes a control piston operatable between terminal positions and is responsive to the movement of a main piston for controlling a valve member which selects the proper path for the driving fluid at any given position of the main piston.

Still another object of this invention is to provide a valve assembly for a fluid driven motor which valve assembly includes at least one control member which is moved between fixed terminal positions by a fluid system driven by a main reciprocable piston assembly and which control member controls the movement of a sliding valve member which selects the proper path of the driving fluid.

A further object of this invention is to provide a valve assembly for a fluid driven motor which valve assembly includes at least one control member which is moved between fixed terminal positions by a fluid system driven by a main reciprocable piston assembly, which control member controls the movement of a sliding valve member which selects the proper path of the driving fluid, and a member for continually urging the control piston to one of its terminal positions so that the valve assembly will be in position for immediate start-up regardless of the stopped position of the main piston.

A still further object of this invention is to provide a valve assembly for a fluid driven motor which valve assembly includes at least one control member which is moved between fixed terminal positions by a fluid system driven by a main reciprocable piston assembly, which control member controls the movement of a sliding valve member which selects the proper path of the driving fluid, and a spring constantly urging the sliding valve member into contact with the surface upon which its slides so as to automatically compensate for the wear of the slidable valve member.

With the above and other objects in view that will hereinafter appear, the nature of the invention will be more clearly understood by reference to the following description, the appended claimed subject matter and the several views illustrated in the accompanying drawings.

In the drawings:

FIGURE 1 is a perspective view of the herein described novel air saw with parts broken away and shown in section for clarity.

FIGURE 2 is a fragmentary perspective view of a portion of the herein described novel air saw and shows in particular the details of a draw-cut block.

FIGURE 3 is a plan view of the air saw and especially shows the valve assembly with the cover removed.

FIGURE 4 is a vertical central sectional view of the herein described air saw and shows in particularity the relationship between the valve assembly and the main piston assembly.

FIGURE 5 is a sectional view taken along the line 5—5 of FIGURE 3 and shows in particular the disposition of the laterally extending fluid channels.

FIGURE 6 is a sectional view taken along the line 6—6 of FIGURE 3.

FIGURE 7 is a sectional view taken along the line 7—7 of FIGURE 6, and shows in particular the spring means for urging a control cylinder to its normally forward position and the relationship of the communicating bores and channels between the main and control cylinders.

FIGURE 8 is a diagrammatical view and in particular illustrates the operation of a stroking movement of the main piston.

FIGURE 9 is a bottom view of the valve assembly of the present invention.

FIGURE 10 is a modified form of the main piston.

Referring to the drawings and in particular to FIGURE 1 thereof, an air motor generally designated by the numeral 10 is shown in combination with an air saw which is generally designated by the numeral 11. The air saw 11 comprises a blade 12 having teeth 13 and is connected to a piston rod 14 by suitable means such as a slot 15 and screws 16. The piston rod 14 is guided for axial movement by a guide extension 17 which is comprised of an axially elongated barrel 18 and a perpendicular flange 19. The barrel 18 has an oil hole 20 formed transversely through one wall thereof which communicates with the piston rod 14 to assure proper lubrication between the contacting surfaces of the barrel 18 and the rod 14. The piston rod 14 is further provided with an extension or ear 21 which is slidable in an axial slot 22 cooperatively disposed therewith in the barrel 18. The cooperation between the ear 21 and slot 22 assures the vertical disposition of the saw blades 12 during the reciprocation of the piston rod 14.

Disposed between the flange 19 and a main cylinder 23 is a collar or flange 24, the function of which will be hereinafter explained. The main cylindrical body 23 is further provided at each end thereof with collars or flanges 25 and 26. The collar 25 is provided with threaded bores 27 spaced conveniently about its periphery. The collars 24 and 19 are respectively provided with bores 28 and 29. The flanges 19, 24 and 25 are secured together after aligning their respective bores 29, 28 and 27 by convenient means such as threaded bolts 30.

A main piston assembly 31 is reciprocable within a bore 32 of the main cylinder 23 and comprises the before mentioned piston rod 14 and pistons 33 and 34. With particular reference to FIGURE 7 of the drawings, it can be seen that the left piston 33 comprises a collar 35 which has a flanged portion 36 and an axial extension 37 which abuts a shoulder 38 of the piston rod 14 and is slidable to its position along the reduced diameter portion 39 of the piston rod 14. A cylindrical member 40 having a reduced central portion 41, opposed upstanding flanges 42 and 43 and butt extensions 44 and 45 is also mounted on the reduced diameter portion 39 of the piston rod 14 and abuts the flange portion 36 of the member 35. An O-ring 46 is disposed within the cylindrical slot formed by flanges 36 and 42. The other end of the reduced portion 39 of the piston rod 14 is provided with a threaded bore 47 which receives a threaded bolt 48 to secure a strike end cushioning extension 49 thereto. The strike end cushioning member 49 comprises a flange 50 which contacts the butt end 45 of the cylindrical member 40 and an extended portion 51 having a cut-out portion 52 to accommodate the head 53 of the bolt 48. The strike end cushioning extension 49 cooperates with a reduced bore extension 54 which is formed in the end flange 26. The extension 49 and bore 54 are spaced apart from each other in the order of 0.001 inch and thus cooperatively effect an air cushion when the piston rod 14 reaches its most righthand position as shown in FIGURE 7. As can further be seen from FIGURE 7, the lefthand end of the main cylinder 23 is also provided with an air cushioning means. The coaction of the axial extension 37 of the collar 33 with the inwardly extending portion of the collar or flange 24 effects a lefthand strike end air cushion similar to the air cushion described above in relation to the righthand strike end.

Flanges 43 and 50 form a space therebetween into which a second O-ring 47 is held in sealing engagement with the bore 32 of the main cylinder 23. The two O-rings 46 and 47 as well as other O-rings that will be hereinafter disclosed may be formed of an elastomeric material such as natural rubber and its substitutes or suitable material such as polytetrafluoroethylene and polytrifluorochloroethylene.

An extension 55 abuts the reduced bore extension portion 54 of collar 26. The extension 55 comprises a cylindrical body portion 56 and a collar 57 which cooperates with flange 26. As is best shown in FIGURE 4 of the drawings flange 26 is provided with threaded bores 58 conveniently spaced about its periphery. Bores 59 are also provided in flange member 57 and are spaced about its periphery for alignment with the bores 58. Threaded bolts 60 serve to fasten flanges 26 and 57 together. The bottom of main cylinder 23 is provided with an exhaust port 61 which communicates with the atmosphere and the interior of the main cylinder 23 and is disposed between the operational positions of pistons 33 and 34.

The main cylinder 23 is further provided with slots 62 and 63 which communicate through the wall of the main cylinder 23 and into the bore 32 thereof. The slot 62 communicates with the bore 32 to the right of piston 34 while slot 63 communicates to the left of piston 33. A T-shaped recess 64 is formed within the upper surface of the main cylinder 23 and its longitudinal extent is in alignment with slots 62 and 63. The base of the T-shaped slot 64 is generally designated 65 and extends axially along the cylinder 23 approximately to its mid-point. The crossed-portion 66 of the T-shaped slot 64 is formed by a cut transversely of the axial extent of cylinder 23. The cylinder 23 is further provided with bores 67 and 68, for a purpose to be later described.

Referring now to the valve assembly which is generally designated 69 and comprises a body portion 70 and a cover 71. The top of the body portion 70 has a recess or cut-away portion 72 located therein of generally rectangular shape. Disposed within the body portion 70 and communicating with the recess 72 are openings 73 and 74 which extend vertically and part-way through the body 70. The opening 73 communicates with an axial channel 75 which in turn communicates with the opening 76 disposed in line with the slot 63 of the cylinder 23.

The opening 74 is located in opposed relation to the opening 73 and communicates with a bore 77 which is disposed axially of the body portion 70. The axial bore 77 in turn communicates with a vertically disposed bore 78 which in turn is disposed in line with the slot 62. The valve assembly is further provided with an opening 79 located centrally of openings 73 and 74 and which is also vertically disposed within the body portion 70. The openings 79 communicates with a channel 80 which is axially formed within the body portion 70. The channel 80 and the base 65 (of the T-shape slot 64 cut in the upper surface of the main cylinder 23) cooperate to form an axial channel 81. A transverse cut 82 is further provided in the body 70 and cooperates with the transverse portion of T-shape slot 64. The transverse cut 82 extends the entire width of the body member 70 and therefore communicates with the atmosphere.

The cut-away portion 72 forms a slideway for a valve member 83. The valve member 83 is provided with opposed longitudinal ears 84 and 85 which, in turn, are respectively provided with openings 86 and 87. The openings 86 and 87 respectively communicate with the vertically disposed openings 74 and 73. It should be noted that the sets of openings 86, 74, 87 and 73 are respectively aligned, one set at a time at terminal positions of the valve member 83. When one set of the openings are aligned so as to cooperatively form a vertical channel, the other set of openings will be out of alignment. At the most lefthand terminal position of the slidable valve 83, openings 74 and 86 will be aligned, and openings 73 and 79 will communicate with a generally rectangular chamber 88 formed by the cooperation of a central portion 89 of valve member 83 and the upper extent of body portion 70. In turn, when the valve member 83 is at its most righthand terminal position, openings 74 and 79 will communicate with the chamber 88 while openings 73 and 87 will be in alignment.

The valve member 83 is further provided with transverse ears 90 which have holes 91 disposed therethrough. The longitudinal travel of the valve member 83 is controlled by slots 92 formed within the body portion 70 of the valve assembly 69. The ears 90 are slidably operative within the slots 92 and therefore limit the extent of sliding of the valve member 83.

As can best be seen from FIGURES 6 and 7 of the drawings, opposed longitudinal bores 93 are further provided within the body portion 70 of the valve member 69. The bores 93 and slots 92 communicate with each other. Valve pistons 94 are disposed for slidable movement within the bores 93. The pistons are comprised of a cylindrical body 95 having radial slots 96 at the longitudinal ends thereof into which O-rings 97 are placed for sealing contact with the bore 93. The pistons 94 are further provided with an upstanding portion or stem 98 which communicates with the holes 91 of the ears 90. It can thus be seen that upon reciprocation of the valve member 83, the pistons 94 will in turn reciprocate within the bores 93.

Further provided in the valve body portion 70 are channels 99 which are formed axially in the lower surface thereof and communicate with the upper surface of cylinder 23 as best shown in FIGURE 9. One end of each of the channels 99 cooperate with the bores 68 and the other ends communicate with bores 100 formed within the body portion 70 and extending into bores 93 to the left of each piston 94. The body portion 70 of valve assembly 69 is further provided with channels 101, one end of which communicate with the bores 67 and the other end of which open into bores 93 to the right of each piston 94 through bores 102 which are disposed within the body portion 70.

The cover 71 is fitted to the body portion 70 of the valve assembly 69 by means of bolts 103 which are threaded into aligned threaded bores located in appropriately spaced positions along the top periphery of body portion 70. As best can be seen in FIGURE 4 of the drawings, the cover 71 is provided with a rectangular indent 104 into which a flat leaf spring 105 is operatively bowed so as to apply a spring loading stress to the upper portion 89 of the slidable valve 83. The spring member 105 assures that the valve member 83 will constantly be held against the surface of the slideway 72. The spring 105 acts in such a manner to compensate for the frictional wear of the bottom surfaces of valve member 83 due to its frictional sliding contact with slideway 72. The cover 71 is further provided with a threaded opening 6 into which a suitable air inlet block 107 is threaded and an air supply pipe 108 suitably coupled to the air inlet block 107.

As shown in FIGURE 7, the body portion 70 is further provided with threaded bores 109 which extend axially into the body 70 from the sides thereof and are aligned with bores 93. Helical coil springs 110 are placed into bores 109 and are cooperatively held against the ends of respective pistons 94 by bolts 111 which are threadably engaged in the bores 109. The bores 109 are recessed at their outer ends for abutting contact with heads 112 of bolts 111. The heads 112 of bolts 111 are provided with slots 113 and thereby form the means by which the compressive force upon the springs 110 may be adjusted. The springs 110 assure that upon each stopping of the saw the pistons 94 will be urged to a terminal position so that openings 86 and 74 will be alignment and thus prevent dead-center stopping of pistons 94.

A modification of the main piston assembly is shown in FIGURE 10 wherein a main cylindrical piston body 114 is provided with reduced diameter butt portions 115 and 116. Circumferential slots 117 are further provided toward the center of the piston body 114 from the butt portions 115 and 116. Suitable seals such as O-ring 118 are sealingly engaged within the slots 117. The piston 114 is further provided with an axial bore 119 and a threaded portion or reduced bore 120 extended therefrom. A piston rod 121 having a threaded portion 12 of reduced diameter is threadably engaged with bore 120 to connect the piston 114 to the piston rod 121.

The operation of the air motor is as follows. The valve member 83 will be in its leftmost position as indicated in FIGURE 4 due to the action of coil spring 110 thereupon. The driving fluid enters the valve assembly 69 from its supply source (not shown) through the conduit 108, and block 107 and thereupon into the valve assembly 69 through opening 106. The driving fluid thereupon flows through the openings 86 and 74. Thereafter, the driving fluid is transmitted to the bore 32 of the main cylinder 23 through the bores 77 and 78 and through the slot 62. The fluid drives the piston rod 14 to the left by its action upon the right hand piston member 34. The fluid trapped between the lefthand side of the main cylinder 23 and the piston 33 is forced through the slot 63 into the opening 76, along the channel 75 and into the chamber 88 through the cooperating opening 73. The fluid is thereupon exhausted to atmosphere through the opening 79, channel 81 and T-shaped slot 64. The movement of the piston assembly 31 to the left, as above described, causes the piston 34 to move to the left past the bore 68 to place it in communication with the fluid under pressure in the bore 32. The fluid entering the bore 68, as best illustrated in FIGURE 8, travels along the channel 99 which connects with the bore 100 to the left of the valve pistons 94 and thus operates to force the pistons 94 to the right against the compression action of the spring 110 as best shown in FIGURE 7. It will thus be apparent that the movement of the pistons 94 to the right slides the valve member 83 also to the right and positions the valve member so that the openings 87 and 73 are in line and so that openings 79 and 74 open into the chamber 88. This valve arrangement thus permits the driving fluid to enter into the main bore 32 of the main cylinder 23 to the left of the piston 33 through openings 87 and 73, channel 75, opening 76 and slot 63. The direction of the piston will then be changed and forced to the right whereupon trapped fluid between the right piston 34 and the right end wall of the main cylinder will be forced upwardly through the slot 62 and into chamber 88 through bores 78 and 77 and openings 74 and 86. This driven fluid is then directed to atmosphere through the opening 79, channel 81 and T-shaped slot 64. It should be noted that the close tolerance fit obtained between members 51 and 54 affords a cushioning action to the piston rod 14 upon the end of its travel towards the right.

The movement of the piston assembly 31 to the right, as above described, causes the piston 33 to move to the right past the bore 67 to place it in communication with the fluid under pressure in the bore 32. The fluid entering the bore 67, as best illustrated in FIGURE 8, travels along the channel 101 and through bores 102 to force the valve pistons 94 to the left and thereby complete one full cycle of the air motor 10.

The continued movement of the valve member 83, first to the left and then to the right, permits the controlled direction of the driving fluid which operates to reciprocate the piston rod 14. It, therefore, appears obvious that by attaching a blade 12 to the end of the piston rod 14 that an operative air saw 11 is thus formed, which can be immediately started up regardless of the position of the main piston assembly upon stoppage. As before mentioned, the wear between the valve member 83 and the slideway 72 of the valve assembly 69 is automatically compensated for by the action of the flat leaf spring 105 which spring loads the valve member 83 against the slideway 72.

The operation of the modified form of the piston assembly, as shown in FIGURE 10, is the same as the above described operation. In the interest of brevity, the operation of this modified form need not be set forth in detail.

It is often desirable to utilize the air saw of the present invention as a draw saw so that it can be held against the branch desired to be cut and for this purpose a cooperating draw-cut block 123 is provided with surfaces 124 and 125 formed on a main block portion 126 and a flange 127, respectively. The main block portion 126 is provided with a downwardly extending slot 128 of such extent as to permit the draw-cut block 123 to be positioned on the barrel 18 without removing the blade 12 from the piston rod 14. The draw-cut block 123 is also provided with a bore 129 formed longitudinally within the main block portion 126. The bore 129 cooperates with the barrel 18 and is secured thereon by means of screws 130 which threadably connect the upstanding sections of the main block portion 126 formed by the slot 128 and thus draw the upstanding portions together and secure the draw-cut block 123 to the barrel 18.

When the draw-cut block 123 is being used the operator holds the flange 127 against the branch, or other material, which is to be cut. Of course, the teeth 13 are of the type which cut during a draw-stroke during movement of the blade 12 to the right as is shown in FIGURE 2. It will be seen that the collar 18 is recessed inwardly of the flange 127 and that the blade 12 can enter the slot 128 such that a complete cut can be made through the material which is being sawed.

While preferred forms and arrangement of parts have been shown in illustrating the invention, it is to be clearly understood that various changes in details and arrangement of parts may be made without departing from the spirit and scope of the invention as defined in the appended claims.

What is claimed is:

1. A valve assembly for directing the flow of a driving fluid comprising a valve body operatively associated with a cylinder and piston assembly, said valve body having channels located therein for alternatively directing the flow of the driving fluid to opposite ends of said cylinder and piston assembly, a valve member slidable between terminal positions within a slideway formed in said valve body, said valve member being provided with a pair of ears having openings therein, pistons reciprocable between terminal positions within cylinders formed within said valve body, said pistons each having a radial extension, each said extension being disposed in a respective one of said openings in said pair of ears of said valve member for sliding said valve member between fixed terminal positions.

2. A fluid actuated device comprising a cylinder having a piston mounted for reciprocation therein, a piston rod on one end of said piston extending from said cylinder, a valve assembly operatively associated with said cylinder for reciprocating said piston upon the introduction of a driving fluid thereto, said valve assembly comprising a member slidable along a slideway between terminal positions, one of said terminal positions of said member uncovering a first fluid conduit which communicates with said cylinder to one side of said piston for urging said piston in one direction, the other of said terminal positions of said member uncovering a second fluid conduit which communicates with said cylinder to the other side of said piston for urging said piston in an opposite direction from said one direction, and means for constantly urging said valve member against the slideway, said valve assembly including a double acting valve piston, means connecting said valve piston directly to said valve member, means for simultaneously reciprocating said double acting valve piston and said valve member, and spring means in axial alignment with said valve piston for urging said valve piston and said valve member to a terminal position.

3. The structure of claim 2 wherein said slideway is formed along a top surface of said valve body and said means for constantly urging the valve member against the slideway comprises a flat spring recessed within a valve body cover which encloses said slideway.

4. A valve assembly for directing the flow of a driving fluid comprising a valve body operatively associated with a cylinder and piston assembly, said valve body having channels located therein for alternatively directing the flow of the driving fluid to opposite ends of said cylinder and piston assembly, a valve member slidable between terminal positions within a slideway formed in said valve body, said valve member being provided with a pair of ears having openings therein, pistons reciprocable between terminal positions within cylinders formed within said valve body, said pistons each having a radial extension, each said extension being disposed in a respective one of said openings in said pair of ears of said valve member for sliding said valve member between fixed terminal positions, means for constantly urging said slidable valve member against the slideway along which it is operable, said slideway being formed along a top surface of said valve body, and said means for constantly urging the valve member against the slideway being comprised of a flat spring recessed within a valve body cover which encloses said slideway.

References Cited by the Examiner

UNITED STATES PATENTS

| | | | |
|---|---|---|---|
| 314,120 | 3/85 | Giddings | 137—625.25 |
| 738,806 | 9/03 | Humphreys | 91—292 |
| 1,215,431 | 2/17 | Tomkins | 91—319 X |
| 1,306,395 | 6/19 | Abrams | 91—290 |
| 2,307,174 | 1/43 | Wachs | 143—68 |
| 2,684,661 | 7/54 | Keiter | 91—295 |
| 2,808,083 | 10/57 | Miller | 143—68 |
| 2,828,767 | 4/58 | Barusch | 137—625.48 X |

FRED E. ENGELTHALER, *Primary Examiner.*